(12) United States Patent
Theriault et al.

(10) Patent No.: US 11,859,738 B2
(45) Date of Patent: Jan. 2, 2024

(54) FLUID COUPLING NUTS AND TOOLS THEREFOR

(71) Applicant: PRATT & WHITNEY CANADA CORP., Longueuil (CA)

(72) Inventors: Gerard Theriault, Longueuil (CA); Hubert Marcotte, Montréal (CA); Gilles Fournier, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 142 days.

(21) Appl. No.: 17/077,936

(22) Filed: Oct. 22, 2020

(65) Prior Publication Data

US 2021/0310588 A1 Oct. 7, 2021

Related U.S. Application Data

(60) Provisional application No. 63/004,642, filed on Apr. 3, 2020.

(51) Int. Cl.
*F16L 19/00* (2006.01)

(52) U.S. Cl.
CPC ......... *F16L 19/005* (2013.01); *F16L 2201/20* (2013.01)

(58) Field of Classification Search
CPC ... F16L 19/005; F16L 19/065; F16B 23/0038; F16B 23/0061; F16B 37/0821
See application file for complete search history.

(56) References Cited

U.S. PATENT DOCUMENTS

| 3,354,757 A | 11/1967 | Grimm et al. |
| 5,269,566 A * | 12/1993 | Do .................. F16L 19/005 |
| | | 285/305 |
| 5,362,110 A | 11/1994 | Bynum |
| 5,890,746 A | 4/1999 | Mueller |

(Continued)

FOREIGN PATENT DOCUMENTS

| EP | 1371453 A2 | 12/2003 |
| WO | WO92/15816 A1 | 9/1992 |

OTHER PUBLICATIONS

European Search Report issued in counterpart application No. 21166761.3 dated Sep. 22, 2021.

*Primary Examiner* — Zachary T Dragicevich
(74) *Attorney, Agent, or Firm* — NORTON ROSE FULBRIGHT CANADA LLP

(57) ABSTRACT

A coupling nut for sealingly engaging a ferrule of a fluid line to a component of a hydraulic system, has: a shank extending along a central axis and having threads to engage a nipple, the threads extending circumferentially around the central axis, the shank defining an inner passage extending along the central axis and sized to receive the fluid line; and a head extending from the shank circumferentially around the inner passage relative to the central axis, the head: defining faces circumferentially distributed about the central axis and edges at junctions between the faces, the faces including torque-transmitting faces each facing a direction having a circumferential component relative to the central axis, and having a cross-section in a plane normal to the central axis, the cross-section defining a plurality of symmetry planes containing the central axis, the torque-transmitting faces free of intersection with the plurality of symmetry planes.

20 Claims, 12 Drawing Sheets

(56) References Cited

U.S. PATENT DOCUMENTS

| | | |
|---|---|---|
| 9,188,569 B2 | 11/2015 | Graham |
| 9,322,811 B2 | 4/2016 | McAdams et al. |
| 2010/0224543 A1 | 9/2010 | Ellis et al. |
| 2012/0267456 A1* | 10/2012 | Imagawa ............. F16L 19/005 285/86 |
| 2013/0195581 A1* | 8/2013 | Unseld ............... F16B 23/0061 |
| 2015/0240976 A1* | 8/2015 | Lefebvre ............. F16L 19/005 |
| 2019/0055970 A1* | 2/2019 | Campbell ........... F16B 23/0069 |
| 2019/0271421 A1* | 9/2019 | Cladiere ............. F16L 19/005 |

* cited by examiner

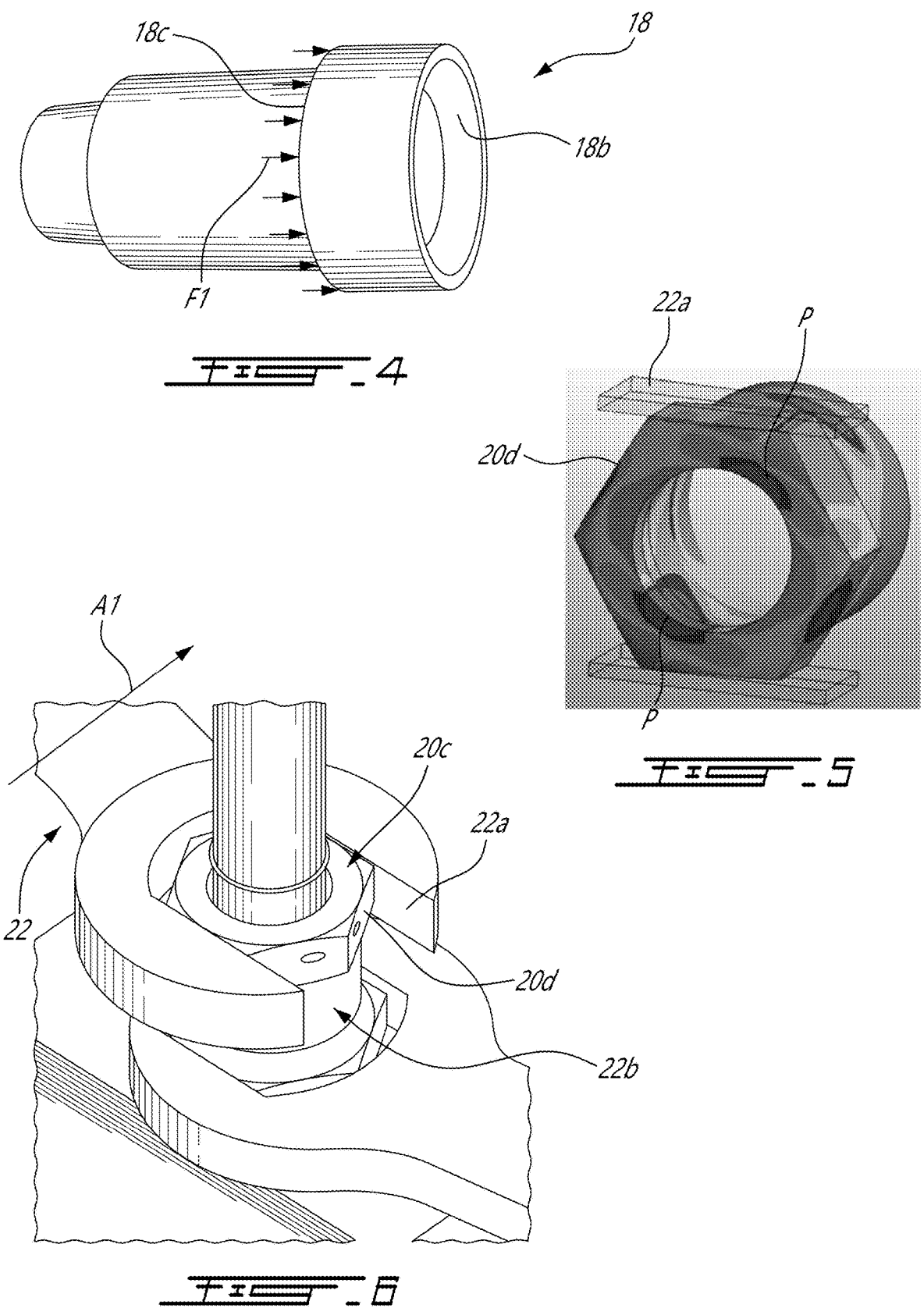

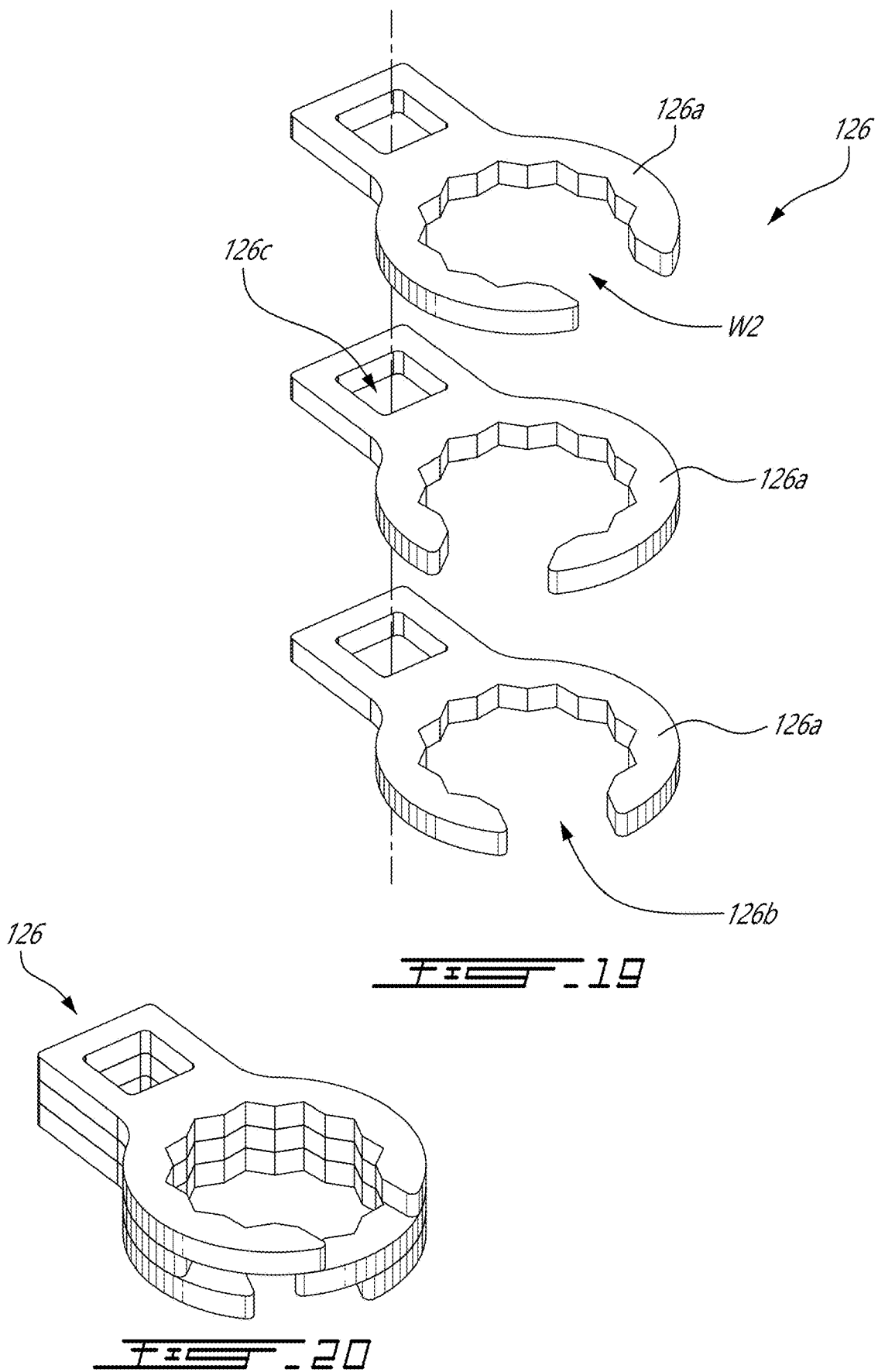

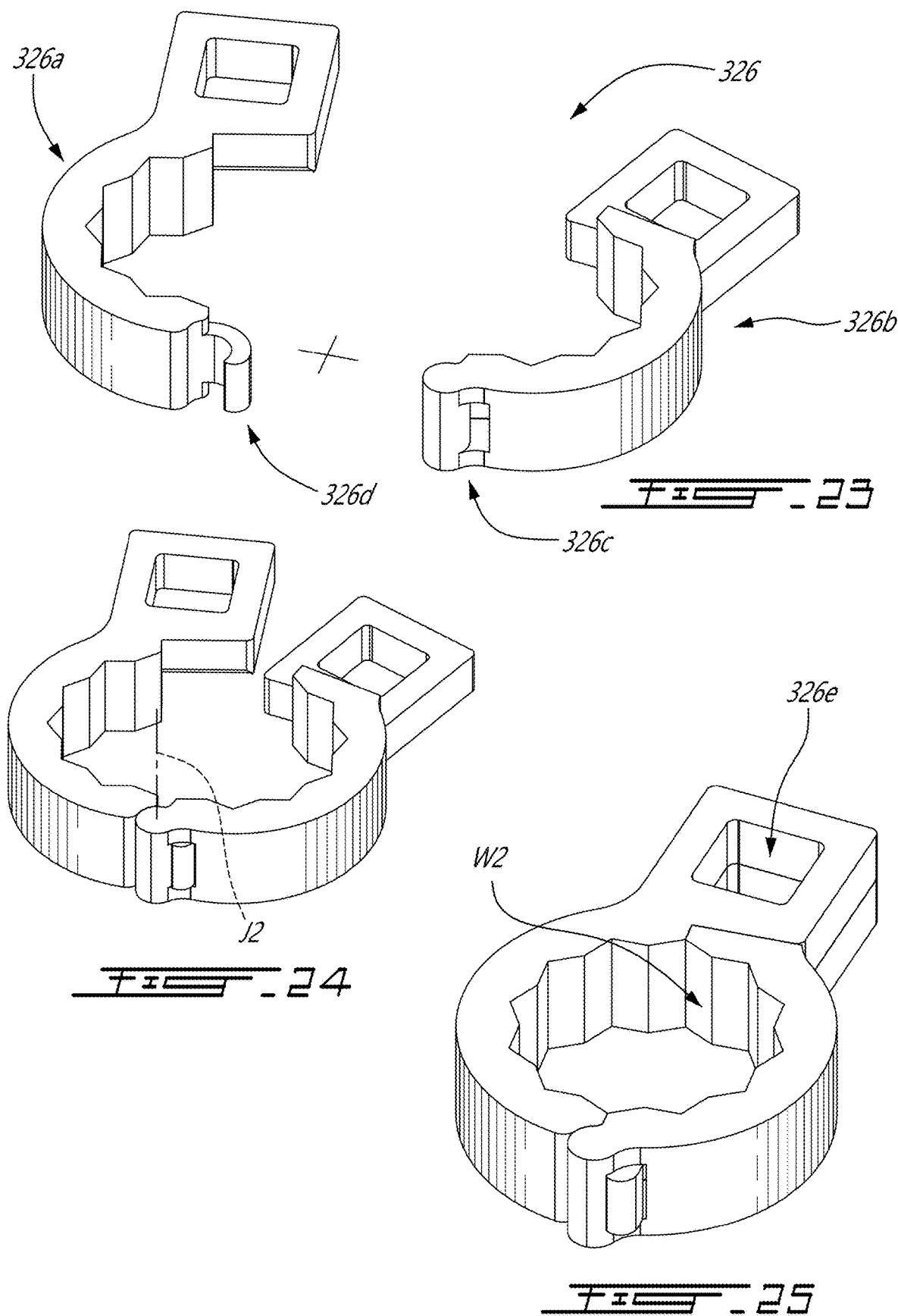

FLUID COUPLING NUTS AND TOOLS THEREFOR

CROSS-REFERENCE TO RELATED APPLICATIONS

This application claims priority from U.S. patent application 63/004,642 filed on Apr. 3, 2020, the entire contents of which are incorporated by reference herein.

TECHNICAL FIELD

The present disclosure relates generally to any machine with hydraulic system(s), such as gas turbine engines, and, more particularly, to coupling nuts and tools used to secure fluid lines, such as lubricant lines, in such engines.

BACKGROUND OF THE ART

Fluid lines are used in gas turbine engines for flowing different fluids such as fuel, air, and lubricants. Fluid lines may be connected to one another or to different components of the gas turbine engine via a coupling nut having a hexagonal head configured to be engaged by an open-end wrench. A ferrule is typically secured to the fluid line and sealingly engaged to a nipple using the coupling nut. The coupling nut is threadably engaged on the nipple. Particularly, a force is applied on a handle of the wrench that translates into rotation of the coupling nut. A torque is applied thereby creating a sealing engagement between the ferrule and the nipple via the engagement of the coupling nut on the nipple.

SUMMARY

In one aspect, there is provided a coupling nut for sealingly engaging a ferrule of a fluid line to a component of a hydraulic system, comprising: a shank extending along a central axis and having threads to threadably engage corresponding threads of the component, the threads extending circumferentially around the central axis, the shank defining an inner passage extending along the central axis and sized to receive the fluid line; and a head extending from the shank circumferentially around the inner passage relative to the central axis, the head: defining faces circumferentially distributed about the central axis and edges at junctions between the faces, the faces including torque-transmitting faces each facing a direction having a circumferential component relative to the central axis, and having a cross-section in a plane normal to the central axis, the cross-section defining a plurality of symmetry planes containing the central axis, the torque-transmitting faces free of intersection with the plurality of symmetry planes.

In some embodiments, the cross-section of the head has a baseline surface defining some of the faces and protrusions protruding away from the central axis from the baseline surface, the protrusions defining a remainder of the faces.

In some embodiments, the baseline surface is an hexagon, the protrusions including six protrusions each protruding from a respective one of faces of the hexagon.

In some embodiments, the baseline surface is a square, the protrusions including at least four protrusions, each of faces of the square defining a respective one of the at least four protrusions.

In some embodiments, the baseline surface is a circle, the protrusions being teeth equidistantly circumferentially distributed about the central axis.

In some embodiments, the direction faced by the torque-transmitting faces is free of a radial component relative to the central axis.

In some embodiments, the cross-section of the head has a double-hexagonal shape.

In some embodiments, the cross-section of the head has a triple-square shape.

In some embodiments, the cross-section of the head has a spline shape.

In some embodiments, the cross-section of the head is axisymmetric.

In another aspect, there is provided a coupling nut for sealingly engaging a ferrule of a fluid line to a component of a hydraulic system, comprising: a shank extending along a central axis and defining threads to threadably engage corresponding threads of the component, the threads extending circumferentially around the central axis, the shank defining an inner passage extending along the central axis and sized to receive the fluid line; and a head extending from the shank circumferentially around the inner passage relative to the central axis, the head: defining faces circumferentially distributed about the central axis and edges at junctions between the faces, the faces including torque-transmitting faces each facing a direction having a circumferential component relative to the central axis, the edges including a first subset of the edges and a second subset of the edges, the edges of the first subset located radially outwardly of the edges of the second subset, all of the torque-transmitting faces contained radially between the edges of the first subset and the edges of the second subset.

In some embodiments, the edges of the first subset are contained within a first cylindrical surface boundary having a first radius, the edge of the second subset are contained with a second cylindrical surface boundary having a second radius different than the first radius, all of the torque-transmitting faces contained radially between the first radius and the second radius In some embodiments, a cross-section of the head on a plane normal to the central axis has a baseline surface defining some of the faces and protrusions protruding away from the central axis from the baseline surface, the protrusions defining a remainder of the faces.

In some embodiments, the baseline surface is an hexagon, the protrusions including six protrusions each protruding from a respective one of faces of the hexagon.

In some embodiments, the baseline surface is a square, the protrusions including at least four protrusions, each of faces of the square defining a respective one of the at least four protrusions.

In some embodiments, the baseline surface is a circle, the protrusions being teeth equidistantly circumferentially distributed about the central axis.

In some embodiments, a cross-section of the head of the coupling nut taken on a plane normal to the central axis has a double-hexagonal shape.

In some embodiments, a cross-section of the head of the coupling nut taken on a plane normal to the central axis has a triple-square shape.

In some embodiments, a cross-section of the head of the coupling nut taken on a plane normal to the central axis has a spline shape.

In some embodiments, a cross-section of the head of the coupling nut taken on a plane normal to the central axis is axisymmetric.

DESCRIPTION OF THE DRAWINGS

Reference is now made to the accompanying figures in which:

FIG. 4 is a three dimensional view of a ferrule of the coupling assembly of FIG. 2;

FIG. 5 is a three dimensional view of the coupling assembly of FIG. 2 with open-end wrenches engaged to the coupling assembly;

FIG. 6 is a three dimensional view of a coupling nut of the coupling assembly of FIG. 2 illustrating pressure contours created when fastening the coupling nut using the open-end wrenches depicted in FIG. 5;

FIG. 19 is a three dimensional exploded view of a tool in accordance with one embodiment;

FIG. 20 is a three dimensional view of the tool of FIG. 19 shown in an assembled configuration;

FIG. 23 is a three dimensional exploded view of a tool in accordance with yet another embodiment;

FIG. 24 is a three dimensional view of the tool of FIG. 23 shown in an open position; and FIG. 25 is a three dimensional view of the tool of FIG. 23 shown in a close position.

DETAILED DESCRIPTION

Figure 1:
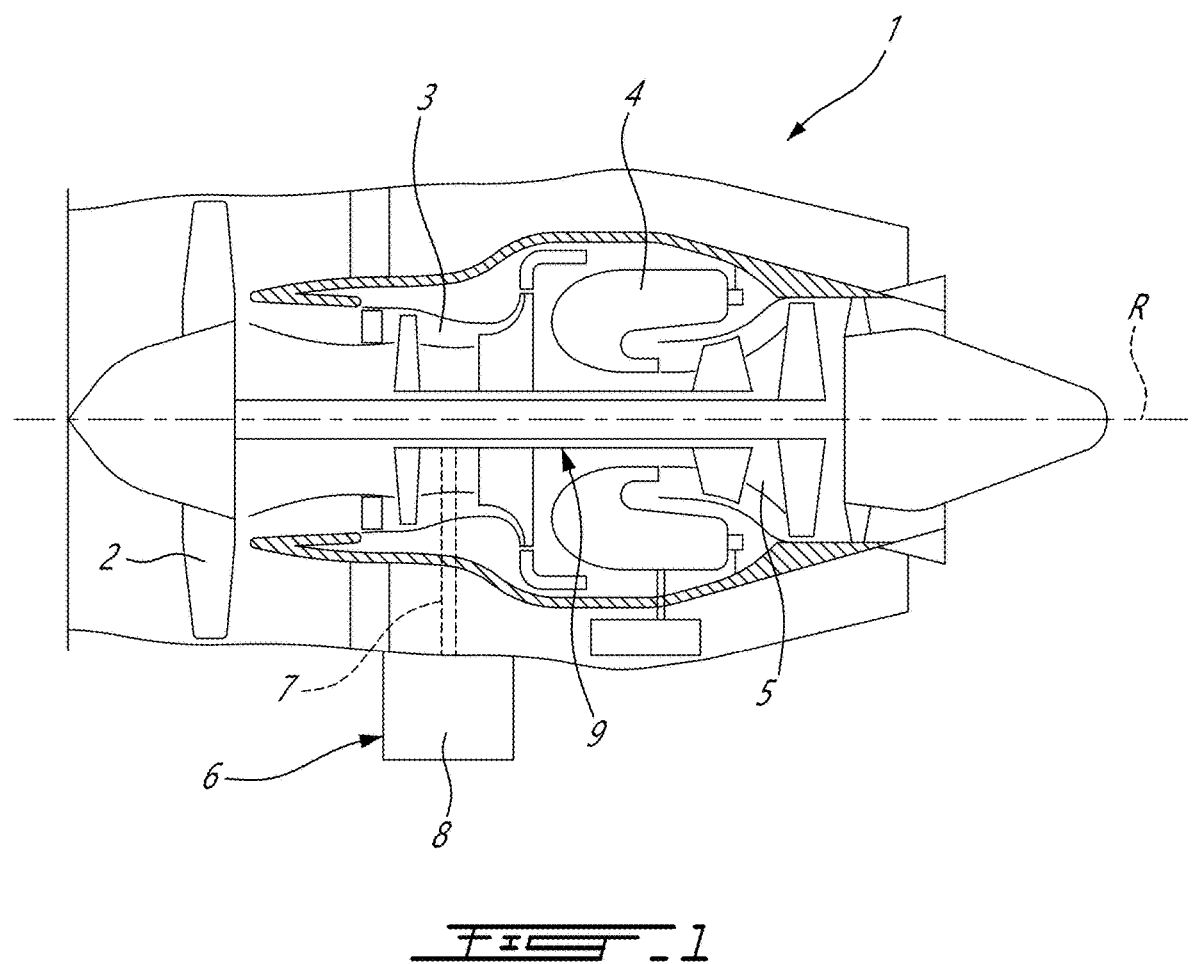
FIG. 1 is a schematic cross sectional view of a gas turbine engine.

Referring to FIG. 1, a gas turbine engine is shown at 1. The gas turbine engine 1 is of a type preferably provided for use in subsonic flight, and comprises in serial flow communication a fan 2 through which ambient air is propelled, a compressor section 3 for pressurizing the air, a combustor 4 in which the compressed air is mixed with fuel and ignited for generating an annular stream of hot combustion gases, and a turbine section 5 for extracting energy from the combustion gases. The fan 2, the compressor section 3, and the turbine section 5 are rotatable about a central axis R of the engine 1.

The engine 1 includes a fluid or hydraulic system 6 having one or more fluid lines 7 used to flow a fluid, such as lubricant, fuel, air, from a source 8 of the fluid to a component in need of the fluid. For instance, the fluid system may be a lubrication system operable to flow lubricant from a source of lubricant to a bearing cavity of the engine 1 for providing lubricant to bearings rotatably supporting a shaft 9 of the engine 1. Alternatively, the fluid system 6 may be a fuel system for providing fuel from a fuel reservoir to fuel nozzles of the engine 1. Alternatively, the fluid system 6 is an example of pneumatic system of the engine used for flowing air to an engine or aircraft component for purposes including cooling, actuation, feedback and environment control.

Figure 2:
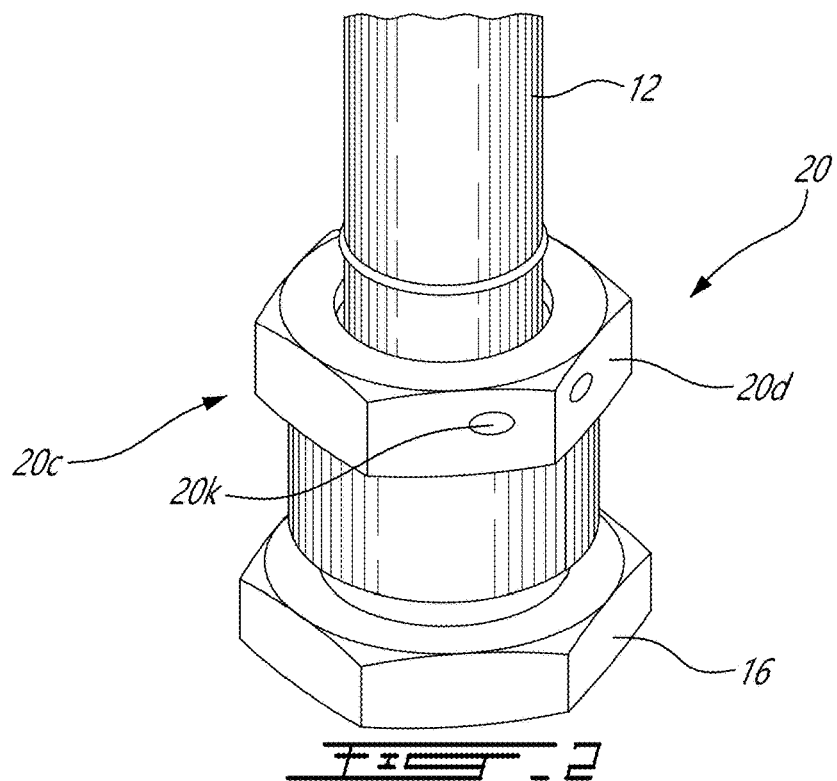
FIG. 2 is a three dimensional view of a coupling assembly in accordance with one embodiment.
Figure 3:
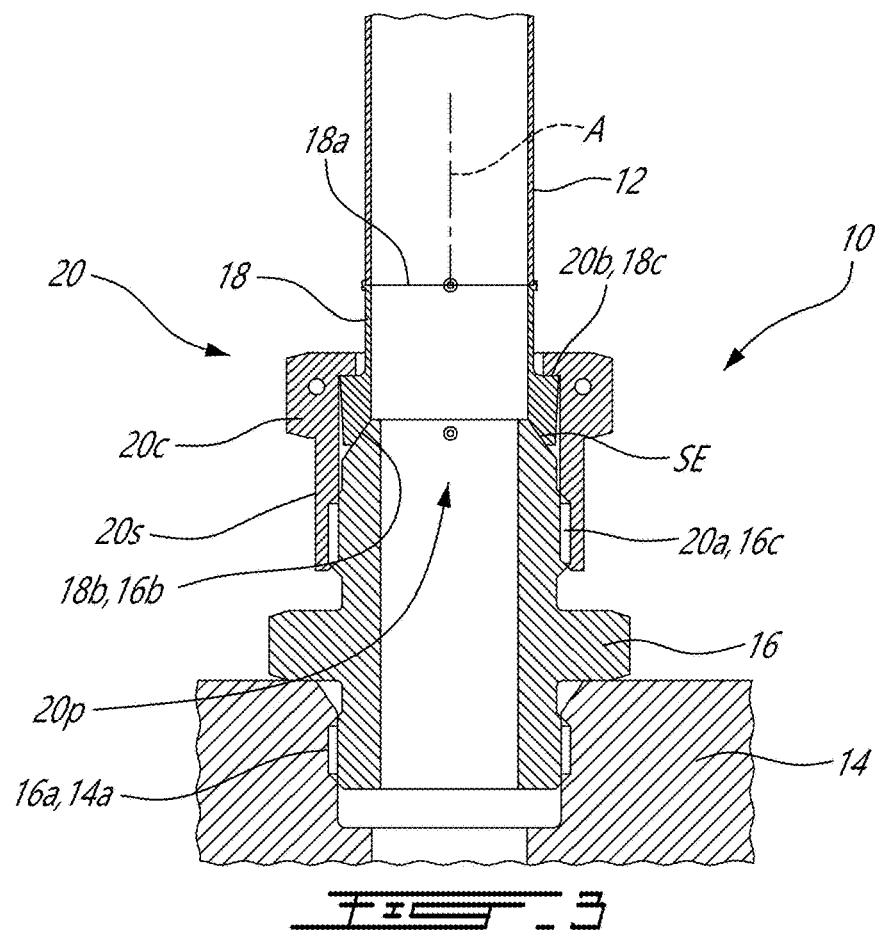
FIG. 3 is a cross-sectional view of the coupling assembly of FIG. 2.

Referring to FIGS. 2-3, the fluid lines used in the fluid system have connecting end that are sealingly engaged to a port. Particularly, the fluid lines may be connected using a coupling assembly such as the one depicted at 10. The coupling assembly 10 is used for securing a fluid line 12 to a component 14 of the gas turbine engine 1. The fluid line 12 may be a fluid tube, which is substantially rigid, or a fluid hose, which may be flexible. The assembly 10 has a nipple 16 that is threadably engaged to the component 14 via suitable correspondingly mating threads 16a, 14a defined respectively by the nipple 16 and by an aperture of the component 14. The assembly 10 has a ferrule 18 that defines a sealing engagement SE with the nipple 16. The ferrule 18 is secured to the fluid line 12, which may be a tube or a hose. The assembly 10 further has a coupling nut 20 that is used for biasing the ferrule 18 in sealing engagement with the nipple 16. The ferrule 18 is shown as being secured to the fluid tube 12 via a weld joint 18a. Any suitable joint may be used.

Referring more particularly to FIG. 3, both of the nipple 16 and the ferrule 18 define frustoconical faces 16b, 18b, which are sealing faces and that are in contact with one another. More specifically, to assemble the coupling assembly 10, the coupling nut 20 and the nipple 16 are rotated one relative to the other about a central axis A, which may be substantially aligned with the line 12, to deform the ferrule 18 such that the sealing engagement SE is created between the frustoconical faces 16b, 18b of the nipple 16 and ferrule 18.

In the embodiment shown, the coupling nut 20 has a head 20c and a shank 20s protruding from the head 20c. The head 20c is engageable by a wrench for fastening the coupling nut 20. Specifically, the head 20c defines faces 20d that are engageable by faces of the wrench. The shank 20s defines inner threads 20a that are threadably engaged with corresponding outer threads 16c of the nipple 16 so that rotation of the nipple 16 relative to the coupling nut 20 translates into a translation of the coupling nut 20 along the central axis A. The coupling nut 20 defines a shoulder 20b that extends circumferentially around the central axis A and that defines a passage 20p via which the fluid lines 12 is received. The shoulder 20b of the coupling nut 20 is in abutment against a shoulder 18c of the ferrule 18. Therefore, rotating the coupling nut 20 about the central axis A results in the shoulder 20b of the coupling nut 20 pushing against the shoulder 18c of the ferrule 18 thereby biasing the frustoconical faces 16b, 18b of the nipple 16 and of the ferrule 18 against one another until the sealing engagement SE is created.

As shown in FIG. 4, a force field, which is illustrated by arrows F1, is therefore generated by the shoulder 20b of the coupling nut 20 and applied on the shoulder 18c of the ferrule 18. This force field F1 and the frustoconical shape of the faces 18b, 16b of the ferrule 18 and of the nipple 16 causes the ferrule 18 to deform until the shape of the face 18b of the ferrule 18 mates with the face 16b of the nipple 16. This creates the sealing engagement SE between the ferrule 18 and the nipple 16.

More specifically, while fastening the coupling nut 20 on the nipple 16, a distance between the frustoconical faces 16b, 18b decreases and a contact begins to develop therebetween. Upon further fastening the coupling nut 20, a sliding engagement between the frustoconical faces 16b, 18b is created and results in an elastic radial expansion of the ferrule 18 relative to the central axis A. This may have for effect of decreasing the area of contact between the frustoconical faces 16b, 18b into an uninterrupted, narrow, circular/elliptic contact area, which results in the sealing engagement SE therebetween, with increased unitary pressure at the contact area. The pressure at the sealing engagement SE must be superior to the combined loads including fluid pressure acting at the interface to prevent leakage. As shown in FIG. 3, an external surface of the ferrule 18 may be frustoconical. This may prevent said external surface from contacting the coupling nut 20 during the radial expansion of the ferrule 18.

Referring to FIG. 2, in some cases, the shoulder 20b of the coupling nut 20 is defined by a thrust wire that circumferentially extends around the central axis A. Such a wire may be inserted into an aperture (not shown) and wrapped around the ferrule 18 on an inner side of the coupling nut 20. The thrust wire may allow inserting the coupling nut 20 on the line 12 after the ferrule 18 is welded on the line 12. After the coupling nut 20 is on the line 12, the thrust wire may be inserted to lock the coupling nut 20 on the line 12. Apertures 20k defined through some of the faces 20d of the coupling nut 20 are used to receive a locking wire, also referred to as a safety cable, that is used to prevent the coupling nut 20 from unfastening.

Referring to FIGS. 2 and 5, the faces 20d of the head 20c of the coupling nut 20 are arranged in an hexagonal pattern such that a periphery of the head 20c has a hexagonal shape when seen in a cross-section taken on a plane normal to the central axis A. The head 20c is shown engaged by an open-ended wrench 22 in FIG. 5. The open-ended wrench 22 has two faces 22a that are in abutment against two opposed ones of faces 20d of the head 20c of the coupling nut 20. The wrench 22 has an open end 22b to allow access to the line 12 for engaging the wrench 22 to the head 20c.

Referring to FIGS. 5 and 6, the two faces 22a of the open-end wrench 22 are facing one another and parallel to one another; the two faces 22a being in abutment with two of the faces 20d of the coupling nut 20. This contact serves to transmit the rotation induced at the wrench to the nut. It has been observed by the inventors of the present application that rotating the open-ended wrench 22 creates local stress concentrations P (FIG. 6) on the coupling nut 20. These stress concentrations P have been found to locally deform the coupling nut 20 from being substantially circular to oval. Such a deformation may propagate to other components of the system (e.g., ferrule, nipple, line) and may affect the sealing engagement SE between the nipple 16 and the ferrule 18. Moreover, it has been observed that such stress concentrations P may plastically deform the coupling nut 20 locally on the nut head. This has further been observed by the inventors of the present application to change the angle of the contact surface between the ferrule 18 and the nipple 16, as the deformation progresses. In other words, the open-ended wrench 22 may not offer a uniform distribution of the force on the coupling nut 20 that may result in the phenomena described above. This may impact an efficiency of the seal created between the ferrule 18 and the nipple 16. Moreover, the force applied to the wrench 22, which is depicted by arrow F1 on FIG. 5, and the resulting force applied by the coupling nut 20 on the faces 22a of the wrench 22 may cause the opposite faces 22a of the wrench 22 to "open" and become non-parallel to one another. It has been observed that such a deformation of the open-ended wrench 22 may amplify the phenomena described above.

Figure 9:
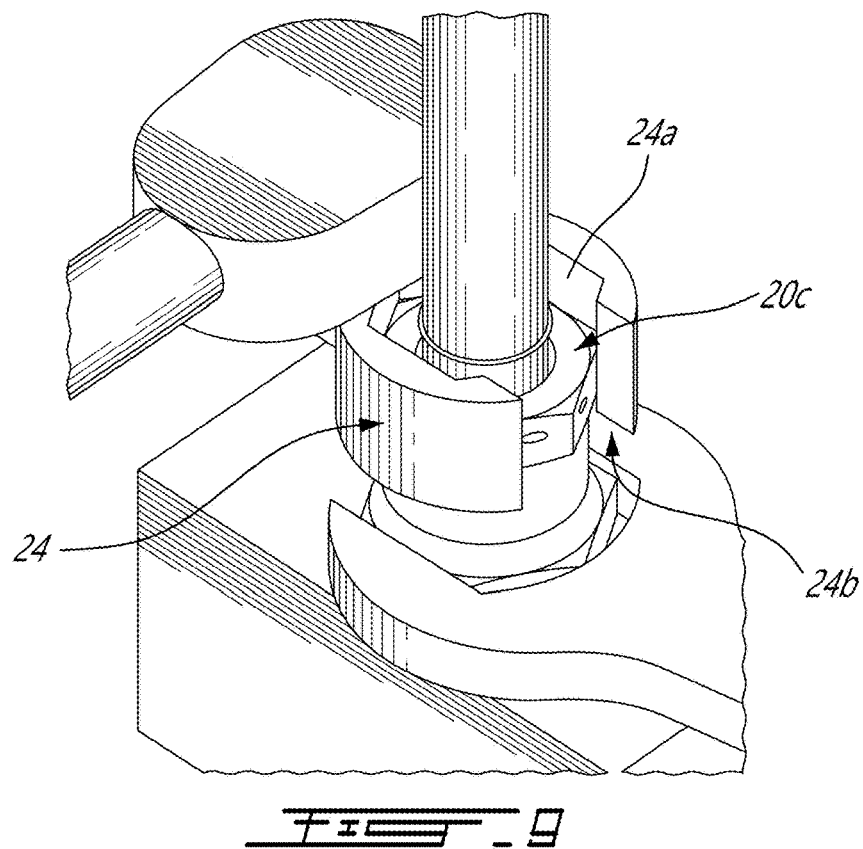
FIG. 9 is a three dimensional view of the coupling nut of the coupling assembly of FIG. 2 engaged by a single hexagonal flare crowfoot wrench.
Figure 10:
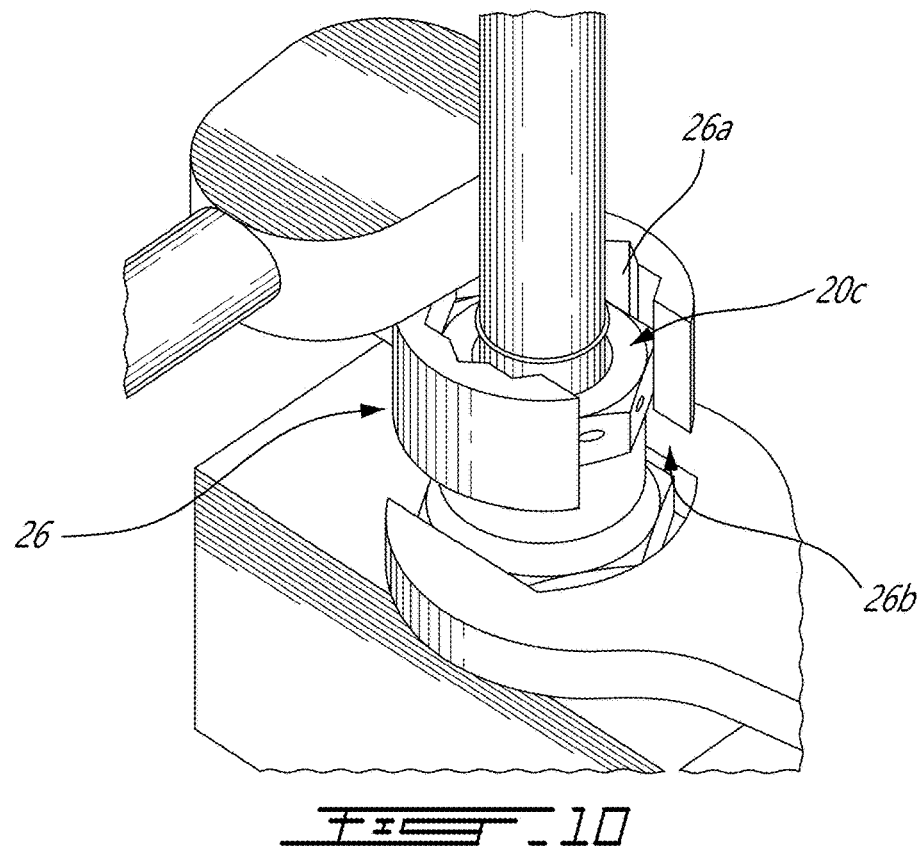
FIG. 10 is a three dimensional view of the coupling nut of the coupling assembly of FIG. 2 engaged by a double hexagonal flare crowfoot wrench.

Three types of wrenches are typically used to fasten the coupling nut 20 on the nipple 16: an open-ended wrench 22, a single hexagonal flare crowfoot wrench 24 (FIG. 9), and a double hexagonal flare crowfoot wrench 26 (FIG. 10). Each of those wrenches have faces 22a, 24a, 26a that are in abutment against faces 20d of the head 20c of the coupling nut 20. All of those wrenches 22, 24, 26 have an open end 22b, 24b, 26b to be able to insert the fluid line 12 (FIG. 2) therethrough. Hence, those wrenches 22, 24, 26 extend circumferentially around a portion of a circumference of the coupling nut 20 and leave a portion of said nut 20 free of interaction with the wrenches 22, 24, 26. The double hexagonal flare crowfoot wrench 26 has more faces than the single hexagonal flare crowfoot wrench 24.

Figure 7:
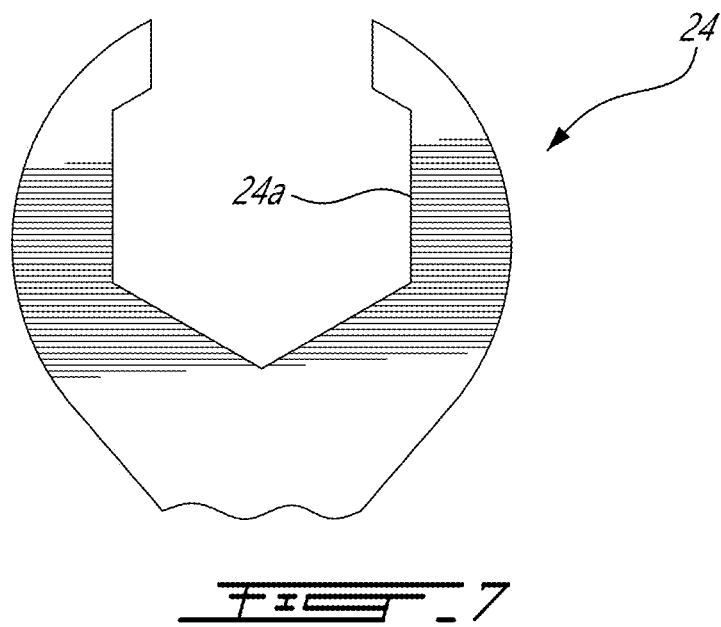
FIG. 7 is a top view of a single hexagonal flare crowfoot wrench in accordance with one embodiment.
Figure 8:
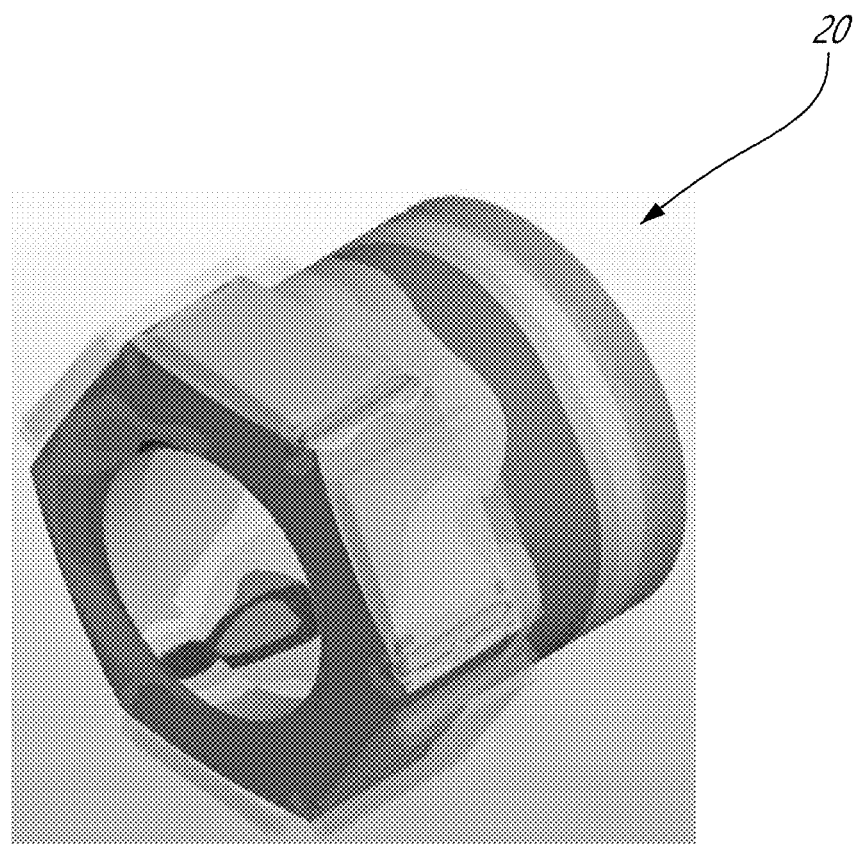
FIG. 8 is a three dimensional view of the coupling nut of the coupling assembly of FIG. 2 illustrating pressure contours when fastening the coupling nut using the double hexagonal closed-ended wrench of FIG. 7.

Referring to FIGS. 7-8, a simulation was carried using the single hexagonal flare crowfoot wrench 24, such as the one illustrated in FIG. 7, that extends circumferentially around most of the coupling nut head 20c. The single hexagonal flare crowfoot 24 has faces 24a in the embodiment shown. Some of the faces 24a are in abutment against the six faces 20d (FIG. 2) of the coupling nut 20. As shown in the stress contours of FIG. 8, the stress is more uniformly distributed than when using the open-ended wrench 22 of FIG. 5. Using the single-hexagonal flare crowfoot 24 reduces the local stress peak and hence the magnitude of deformation of the coupling nut 22 compared to when using the open-ended wrench 22. An evenly distributed load around the nut head 20c, on contact points between the wrench and the coupling nut 20, may result in less of the "ovalization" phenomenon described herein above.

Coupling nuts in accordance with the present disclosure are described herein below. These coupling nuts have heads whose faces are arranged in patterns that may purposively prevent a user from using the open-ended wrench 22 that may amplify the ovalization risk described above. A plurality of possible patterns of faces are described below. However, it will be noted that many other suitable patterns are contemplated without departing from the scope of the present disclosure. For instance, any patterns defining faces circumferentially distributed about the central axis A and preventing the engagement of the open-ended wrench 22 of FIG. 5 are contemplated. Specifically, those heads have edges at junction between faces. The faces and the edges of the heads of the present disclosure are arranged such that the faces 22a of the open-ended wrench 22 of FIG. 5 contact solely the edges while being free of surface contact with the faces of the coupling nut. If none of the faces of the coupling nut is in abutment against the faces 22a of the open-ended wrench 22 of FIG. 5, then the open-ended wrench 22 will be unable to transfer a torque to the coupling nut and will, thus, be unable to deform the coupling nut as explained above. Such coupling nuts may be non-convex polygons, which may be axisymmetric.

Figure 11:
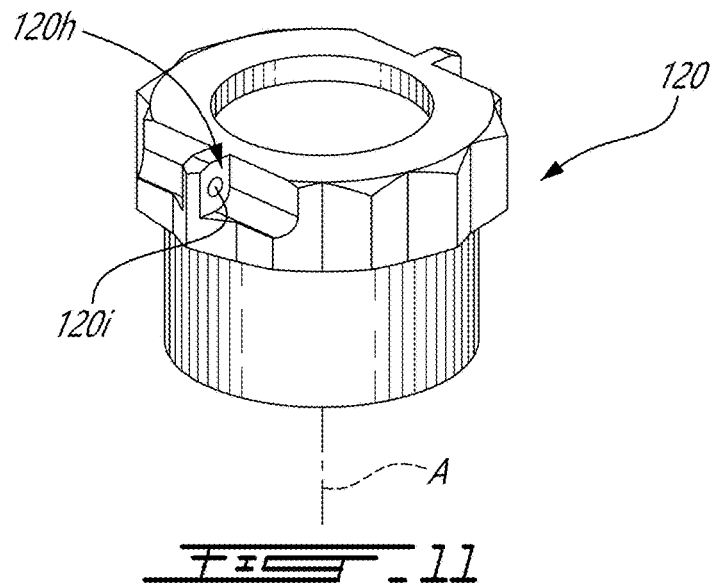
FIG. 11 is a three dimensional view of a coupling nut in accordance with another embodiment.
Figure 12:
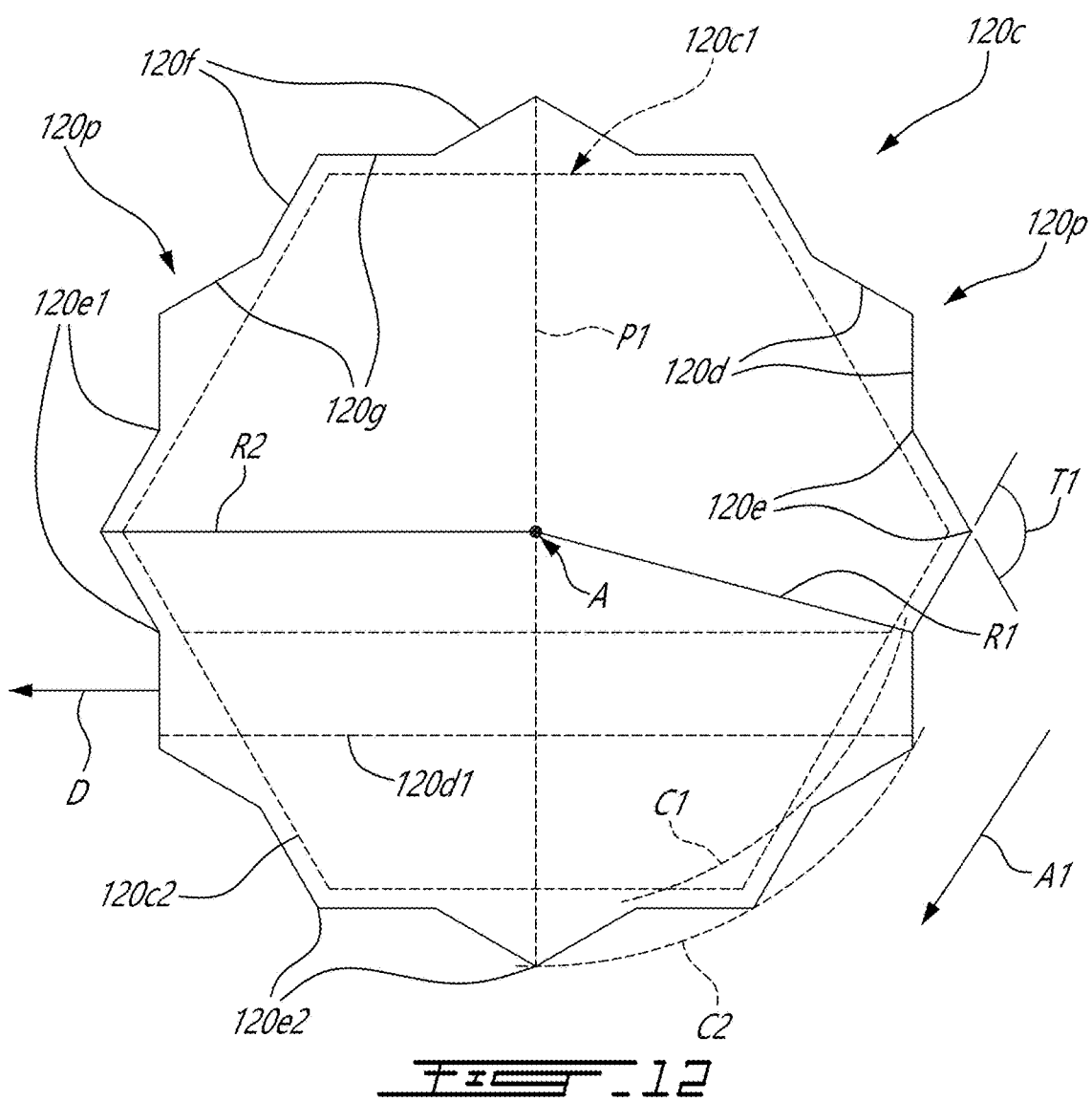
FIG. 12 is a schematic top view of the coupling nut of FIG. 11.

Referring now to FIGS. 11 and 12, a coupling nut in accordance with another embodiment that is incompatible with the open-ended wrench 22 is shown at 120. The nut 120 has a head 120c; a top plan view of the head 120c is shown in FIG. 12. The head 120c is the present embodiment a polygon, more specifically a non-convex polygon, that defines successively convexities and concavities disposed in alternation around a circumference of the head 120c. The head 120c is axisymmetric which allows a wrench to engage the head 120c at more than one relative orientation.

In the embodiment shown, the head 120c of the coupling nut 120 has a pattern corresponding to two superposed hexagons. The head 120c of the coupling nut 120 has 24 faces 120d circumferentially distributed around the central axis A and 24 edges 120e each located between two adjacent ones of the faces 120d. In the embodiment shown, an angle between each two adjacent ones of the faces 120d is about 120 degrees. The faces 120d of the coupling nut 120 include torque-transmitting faces 120f. The torque-transmitting faces 120f are faces that are engaged by a tool for transmitting the force imparted to the tool to the faces of the coupling nut 120 and that result into rotation of said nut along arrow F1. In other words, the torque-transmitting faces 120f of the faces 120d are the faces that are compressed or pushed by the tool to induce rotation of the coupling nut 120 in one rotational direction. Of the 24 faces 120d, 12 may be torque-transmitting faces 120f at a time depending on rotational direction. Each of the torque-transmitting faces 120f may be located circumferentially between two non-torque-transmitting faces 120g. In other words, the torque-transmitting faces 120f may be interspaced with the non-torque-transmitting faces 120g. It will be appreciated that the torque-transmitting faces 120f and the non-torque transmitting faces 120g may be interchanged depending of a direction of rotation of the coupling nut 120. In other words, the faces 120d that are torque-transmitting faces 120f in a first direction of rotation of the coupling nut 120 may become non-torque-transmitting faces 120g in a second direction of rotation of the coupling nut 120 opposite the first direction of rotation and vice versa.

Each of the torque-transmitting faces 120f faces a respective direction D that has a circumferential component relative to the central axis A. Particularly, the torque-transmitting faces 120f are off-centered relative to the central axis A and have an offset to transmit a rotational load. In the embodiment shown, a projection 120d1 (boundaries of said projection being shown with dashed lines in FIG. 12) of each of the faces 120d in the directions normal thereto are free of intersection with the central axis A. As shown in FIG. 12, each of the projections 120d1 of each of the faces 120d lands on an opposite one of the faces 120d being parallel thereto. In the embodiment shown, the projection 120d1 of each of the faces 120d meets an associated one of the non-torque-transmitting faces 120g.

In the embodiment shown, the head 120c has a baseline surface 120c1 that defines some of the faces 120d. The baseline surface 120c1 has a shape corresponding to a convex polygon. In the depicted embodiment, the baseline surface 120c1 is a hexagon but other shapes are contemplated. Protrusions 120p protrude from the baseline surface 120c1 away from the central axis A. In the illustrated embodiment, each of faces 120c2 of the baseline surface 120c1 has one protrusion 120p protruding therefrom away from the central axis A. As will be explained below, these protrusions 120p limit a user from engaging the open-ended wrench 22 to the head 120c of the coupling nut 120.

The shape of the head of the coupling nut is therefore a convex polygon defining protrusions extending away from and beyond faces of the convex polygon. These protrusions prevent the engagement of the open-ended wrench 22 with the head of the coupling nut. In other words, because of these projections, the faces of the open-ended wrench 22 are unable to abut against the faces of the convex polygon in a sufficient way that allows torque to be transmitted to the coupling nut. If a user cannot use the open-ended wrench 22, the ovalization risk described above is limited.

In the embodiment shown, the coupling nut 120 defines a plurality of symmetry planes P1 (only one shown with a dashed line in FIG. 12) that contain the central axis A. Each of the symmetry planes P1 extends from one of the edges 120e to a diametrically opposed one of the edges 120e and intersects the central axis A. In the illustrated embodiment, none of the faces 120d are intersected by the symmetry planes P1. The torque-transmitting faces 120f may be free from intersection with the symmetry planes P1.

Still referring to FIG. 12, the edges 120e include a first subset 120e1 of the edges 120e and a second subset 120e2 of the edges 120e. The edges 120e of the first subset 120e1 are contained within a first cylindrical surface boundary C1 having a first radius R1. The edges 120e of the second subset 120e2 are contained within a second cylindrical surface boundary C2 having a second radius R2 greater than the first radius R1. All of the faces 120d are contained radially relative to the central axis A between the first radius R1 and the second radius R2. All of the torque transmitting-faces 120f are contained radially between the edges of the first subset and the edges of the second subset. The diameter of the cylindrical surface boundary C2 is greater than the corresponding opening in the open-ended wrench 22, which prevents engagement.

In the embodiment shown, the coupling nut 120 presents two tabs 120h, which may be diametrically opposed from one another. Each of the two tabs 120h may present an aperture 120i therethrough. The tabs 120h and apertures 120i may be used for the typical purpose of securing a locking wire or safety cable (not shown) for limiting the coupling nut 120 from becoming unfastened from the nipple 16 (FIG. 2) during use.

Figure 13:
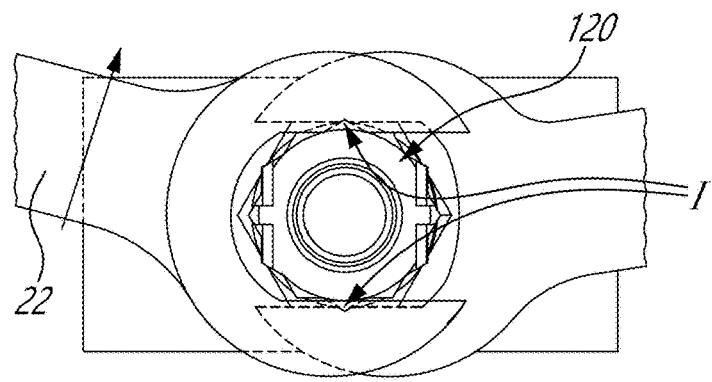
FIG. 13 is a top view of the coupling nut of FIG. 11 illustrating interferences that prevent the engagement between the coupling nut and the open-end wrench.
Figure 14:
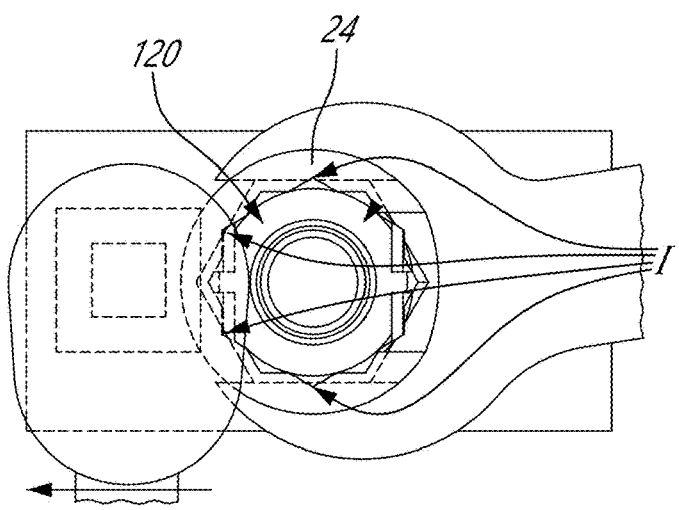
FIG. 14 is a top view of the coupling nut of FIG. 11 illustrating interferences that prevent the engagement between the coupling nut and the single hexagonal flare crowfoot wrench.

Referring to FIGS. 13 and 14, the features described above may prevent a user from using the open-ended wrench 22 shown in FIG. 13 and the single hexagonal flare crowfoot wrench 24 shown in FIG. 14. Those tools, that is the open-ended wrench 22 and the single hexagonal flare crow-foot wrench 24, each have two faces that are diametrically opposed to one another and that are parallel to one another. It may not be possible for a user to mate those tools 22, 24 with the coupling nut 120 because geometrical interferences I may be created between the parallel faces of those tools 22, 24 and diametrically opposed edges 120e of the coupling nut 120. The edges 120e may be defined by the protrusions 120p. In other words, the protrusions 120p prevent the faces of the open-ended wrench 22 and the faces of the single hexagonal flare crowfoot wrench 24 from abutting the faces 120d of the head 120c of the coupling nut 120. Hence, no torque is transmissible from these tools to the coupling nut 120.

If a user were unable to mate the tools 22, 24 with the coupling nut 120, he/she might be tempted to use a version of the same tool but of a greater dimension. In such case, it may be possible for the tool 22, 24 to receive the coupling nut 120, but there will be no transmission of torque possible because the parallel faces of the tools 22, 24 will be abutting against edges 120e of the coupling nut 120. Hence, the faces of the tools 22, 24 may be free of contact with any of the faces 120d of the coupling nut 120, which may result in the inability of the user to use those tools 22, 24 to fasten the coupling nut 120.

Figure 15:
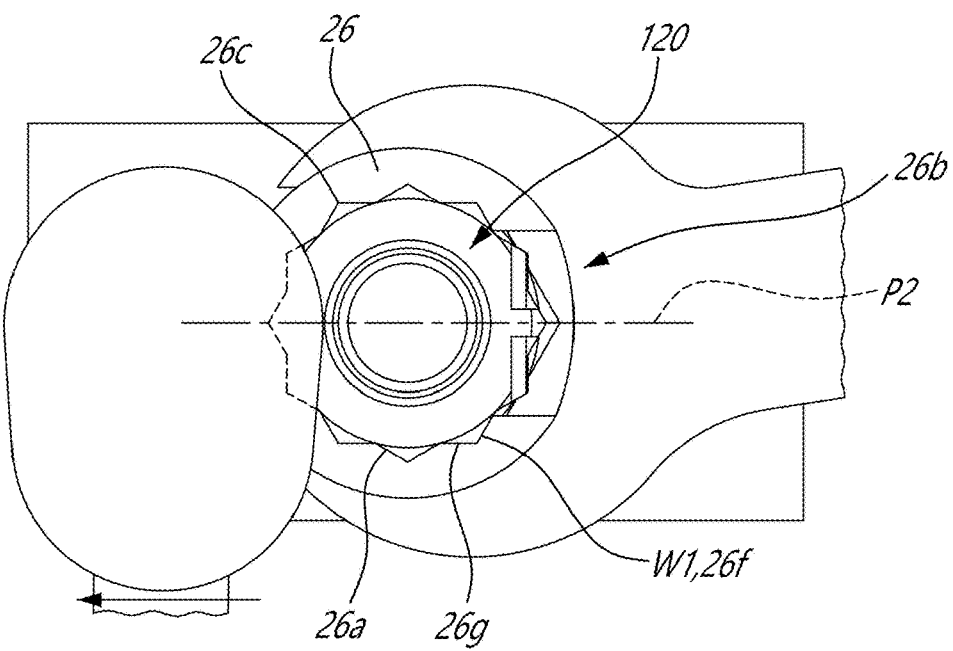
FIG. 15 is a top view of the coupling nut of FIG. 11 engaged by a double hexagonal flare crowfoot wrench.

Referring now to FIG. 15, the commonly available double hexagonal flare crowfoot wrench 26 may be used for fastening the coupling nut 120. Such a tool 26 has a wrenching interface W1 having faces 26a circumferentially distributed about the central axis A but for the opening 26b that is configured for receiving the fluid line 12 (FIG. 2). In other words, the faces 26a of the tool 26 match the faces 120d of the coupling nut 120. The wrenching interface W1 defines edges 26c alternating with the faces 26a. In the embodiment shown in FIG. 15, each of the faces 26a of the wrenching interface W1 is in abutment against an associated one of the faces 120d of the coupling nut 120. Similarly to the coupling nut 120, the faces 26a of the wrenching interface W1 include alternating torque-transmitting faces 26f and non-torque-transmitting faces 26g. In the embodiment shown, the wrenching interface W1 defines one symmetry plane P2 that intersects the opening 26b and that contains the central axis A. The symmetry plane P2 may be free of intersection with the torque-transmitting faces 26f of the wrenching interface W1. In the embodiment shown, projections of the torque-transmitting faces 26f in directions normal to the torque-transmitting faces 26f are free of intersection with the central axis A.

Figure 16:
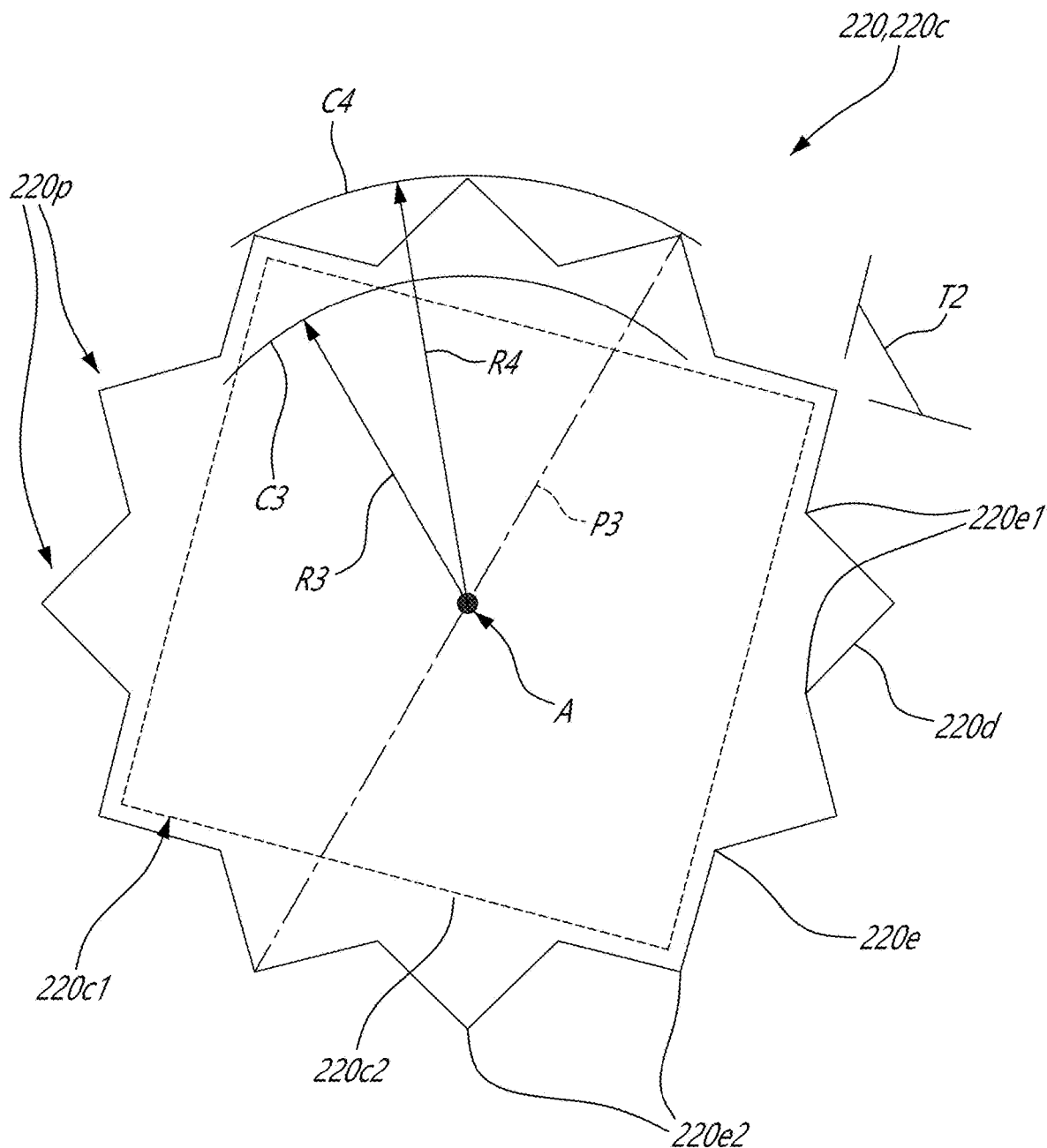
FIG. 16 is a top schematic view of a coupling nut in accordance with another embodiment.

Referring now to FIG. 16, a coupling nut in accordance with another embodiment is shown generally at 220. A cross-section of the coupling nut 220 taken on a plane normal to the central axis A may correspond to three superposed squares, indexed by 30 degrees one to another for an axisymmetric pattern. Angles T2 between each two adjacent ones of faces 220d of the coupling nut 220 may be about 90 degrees. This coupling nut 220 may present the same features as those described herein above with reference to FIG. 12. A tool defining a wrenching interface corresponding to the coupling nut 220 may be used for fastening the coupling nut 220. In the embodiment shown, the head 220c of the coupling nut 220 has 24 faces 220d circumferentially distributed around the central axis A and 24 edges 220e each located between two adjacent ones of the faces 220d.

In the embodiment shown, the pattern of the faces 220d of the head 220c has a baseline surface 220c1 that defines some of the faces 220d. The baseline surface 220c1 has a shape corresponding to a convex polygon. In the depicted embodiment, the baseline surface 220c1 is a square, but other shapes are contemplated. Protrusions 220p protrude from the baseline surface 220c1 away from the central axis A. In the illustrated embodiment, each of faces 220c2 of the baseline surface 220c1 has two protrusions 220p protruding therefrom away from the central axis A. As will be explained below, these protrusions 220p intentionally prevent a user from engaging the open-ended wrench 22 to the head 220c of the coupling nut 220.

In the embodiment shown, the coupling nut 220 defines a plurality of symmetry planes P3 (only one shown with a dashed line in FIG. 16) that contain the central axis A. Each of the symmetry planes P3 extends from one of the edges 220e to a diametrically opposed one of the edges 220e and intersects the central axis A. In the illustrated embodiment, none of the faces 220d are intersected by the symmetry planes P3.

Still referring to FIG. 16, the edges 220e include a first subset 220e1 of the edges 220e and a second subset 220e2 of the edges 220e. The edges 220e of the first subset 220e1 are contained within a first cylindrical surface boundary C3 having a first radius R3. The edges 220e of the second subset 220e2 are contained within a second cylindrical surface boundary C4 having a second radius R4 different than the first radius R3. All of the faces 220d are contained radially relative to the central axis A between the first radius and the second radius.

Figure 17:
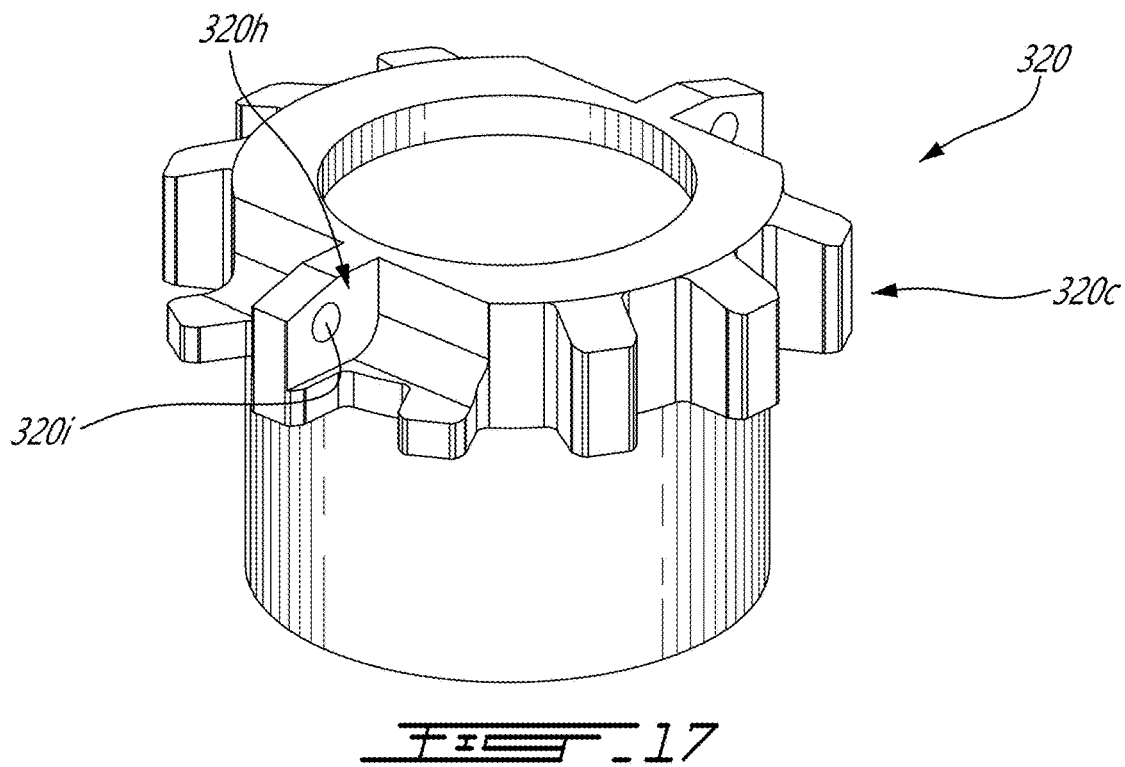
FIG. 17 is a three dimensional view of a coupling nut in accordance with yet another embodiment.
Figure 18:
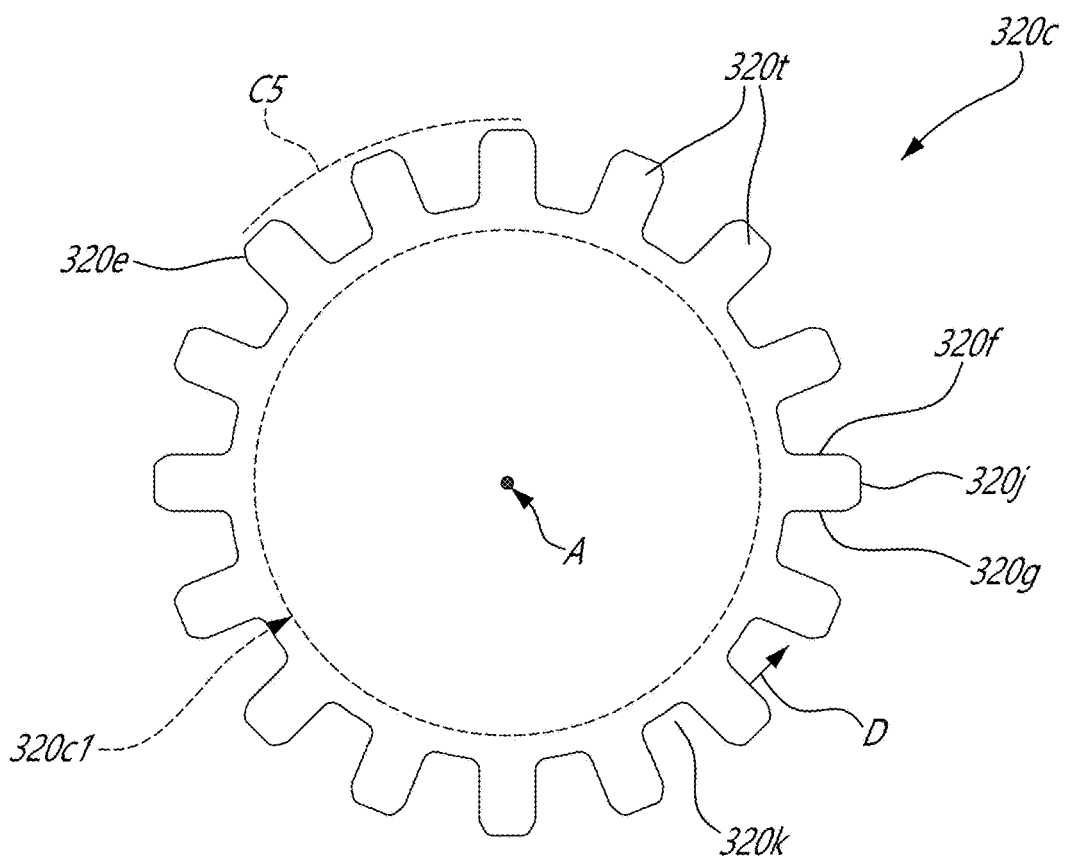
FIG. 18 is a top schematic view of the coupling nut of FIG. 17.

Referring now to FIGS. 17-18, a coupling nut in accordance with yet another embodiment is shown generally at 320. The coupling nut 320 may define similar tabs 320h and apertures 320i as described above with reference to FIG. 11.

In the embodiment shown, the coupling nut 320 has a plurality of faces that defines a spline coupling having a plurality of teeth 320t circumferentially distributed around the central axis A. Each of the teeth 320t defines a torque-transmitting face 320f, a non-torque-transmitting face 320g, and an end face 320j. It is understood that the torque-transmitting faces 320f become the non-transmitting faces 320g when the nut 320 is rotated in a counter clockwise direction. The faces of the head 320c further includes inter-teeth faces 320k each located between two adjacent ones of the teeth 320t. In the embodiment shown, the torque-transmitting faces 320f are facing a direction D that may be solely tangential relative to the central axis A. In other words, the direction D faced by the torque-transmitting faces 320f (and by the non-torque transmitting faces 320g) may be free of a radial component relative to the central axis A. The end faces 320j may face a direction that is solely radial relative to the central axis A and may be unable to transmit any torque regardless of the direction of rotation of the coupling nut 320. In a particular embodiment, the more the tangential component of the torque transmitting face is predominant relative to the radial component, the greater the effective area for load distribution, and less likely the elastic and/or plastic ovalization described above is likely to happen.

The coupling nut 320 may present analog features described above with reference to FIG. 12 that may allow the coupling nut 320 to deter a user from using an open-ended wrench 20 to fasten the coupling nut 320. The coupling nut 320 may define an external periphery rendering torque transmission from the open-ended wrench 20 very difficult. A tool defining a wrenching interface mating with the teeth 320a of the coupling nut 320 is part of the present disclosure.

In the embodiment shown, the shape of the head 320c has a baseline surface 320c1 that defines the inter-teeth faces 320k. The baseline surface 320c1 is a circle. The teeth 320t protrude from the baseline surface 320c1 away from the central axis A. As for the protrusions described above, the teeth 320t limit a user from engaging the open-ended wrench 22 to the head 320c of the coupling nut 320. That is, if an open-ended wrench 22 were to engage the head 320c of the coupling nut 320, only edges 320e defined at intersections between the faces 320f, 320g, 320j of the teeth 320t would be in contact with the faces of the wrench 22 and would be unable to transmit any torque to the coupling nut 320. That is, none of the torque-transmitting faces 320f would be in abutment against the faces of the wrench 22. The open-ended wrench 22 cannot engage with the teeth 320t because a distance between the opposed faces of the open-ended wrench 22 would need to be equal or greater than an outer cylindrical surface boundary C5 to avoid interference, and thus cannot transmit torque. The teeth 320t are located radially inwardly of the outer cylindrical surface boundary C5.

Still referring to FIG. 18, in the embodiment shown, the edges 320e include a first subset of the edges 320e and a second subset of the edges 320e. The edges 320e of the first subset are contained within a first cylindrical plane having a first radius. The edges 320e of the second subset are contained within a second cylindrical plane having a second radius different than the first radius. All of the torque-transmitting faces 320f are contained radially relative to the central axis A between the first radius and the second radius.

Referring to FIGS. 19-20, a tool in accordance with one embodiment is shown at 126. The tool has a wrenching interface W2, which in the illustrated embodiment corresponds to a double-hexagon pattern. However, the wrenching interface W2 of the tool 126 may be selected to correspond to any of the coupling nuts 20, 120, 220, 320 described herein above, or any geometrically applicable pattern. In other words, a shape of the wrenching interface W2 of the tool 126 may be seen as the negative of the shape of the coupling nut 20, 120, 220, 320.

In some cases, the line 12 (FIG. 2) on which the coupling assembly 10 (FIG. 2) is to be located is in close proximity to another element preventing typical access with the aforementioned tools over the tube 12 or the nut shank 20s, using the previously described thrust wire configuration. This other element may be, for instance, a connection between the line 12 and another line of a lubrication system of a gas turbine engine 10, or a custom ferrule 18 in an elbow or tee configuration. Therefore, in those situations, it may be difficult to insert the tool around the line 12 or custom ferrule via its opening. In this particular configuration, when the traditional single-layer tool 26 is prevented from engagement, the tool 126 disclosed herein may be may be used. The tool 126 has a plurality of layers 126a, which may be substantially identical to one another, acting simultaneous on the coupling nut head. Each of the layers 126a of the tool 126 defines a tool drive provided in the form of an aperture 126c. The aperture 126c is square shaped here, but any other suitable shape is contemplated. The apertures 126c of each of the layers 126a are in register with one another once the layers 126a are stacked on the nut. In the embodiment shown, the position of the opening 126b required for engagement over the tube 12 features an angular offset between layers 126a to completely engage all nut head faces with the entire tool stack. Each of the layers 126a may be, one after the other, engaged over the line 12 and slid into the driving engagement with the coupling nut. Once the entire tool stack of layers 126a are in engagement with the coupling nut, the tool drive may be engaged with the tool drives 126b and the coupling nut may be torqued or un-torqued on its fitting (FIGS. 2 and 3). As shown in FIG. 20, the wrenching interface W2 of each of the layers 126a is circumferentially offset one relative to the other. That is, each of the layers 126a is disposed around the coupling nut 20 of FIG. 2 and each of the layers 126a may engage a respective one of the three pairs of opposed faces 20d of the coupling nut 20. More than three layers 126a may be used. Two layers may be used. As shown in FIG. 20, once all of the layers 126a are engaged on the coupling nut, a whole circumference of the coupling nut is surrounded by the tool 126 via its layers 126a. This configuration in which the whole circumference of the coupling nut is surrounded by the tool 126, and in which each of the faces of the coupling nut are engaged by the tool 126, may further contribute in overcoming the ovalization problem described above.

Figure 21:
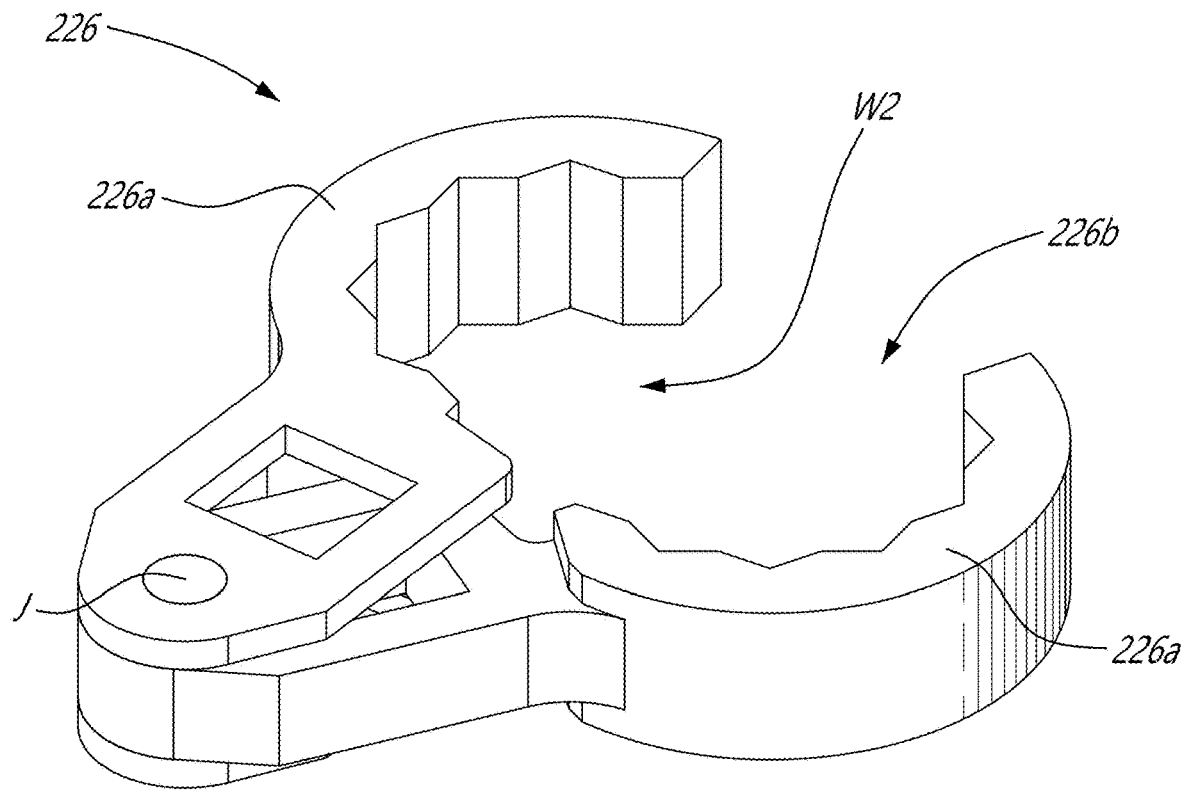
FIG. 21 is a three dimensional view of a tool in accordance with another embodiment shown in an open position.
Figure 22:
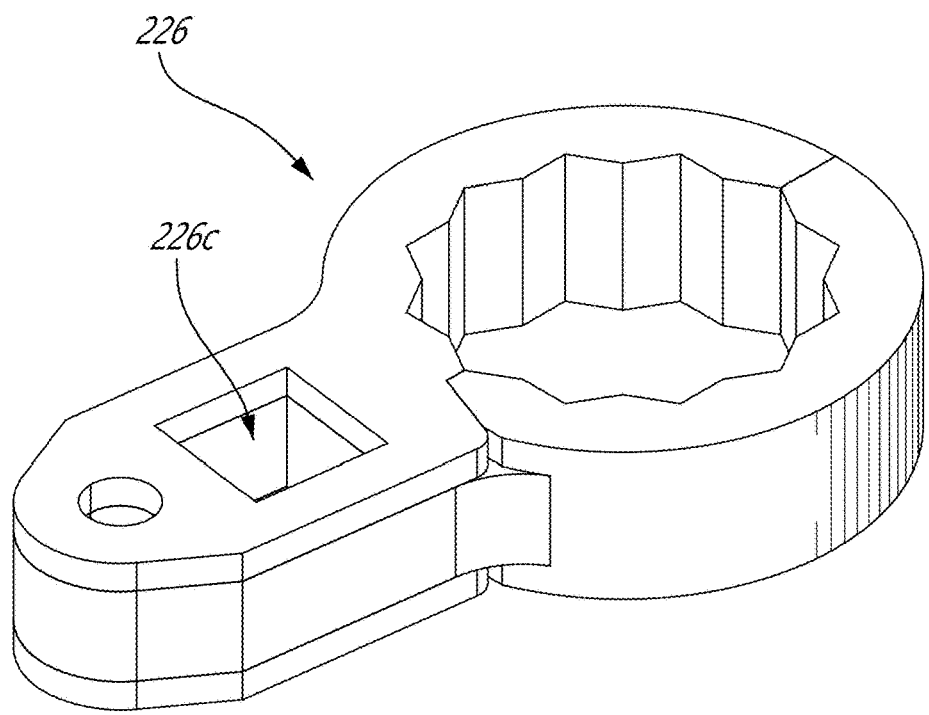
FIG. 22 is a three dimensional view of the tool of FIG. 21 shown in a close position.

Referring to FIGS. 21-22, a tool in accordance with one embodiment is shown at 226. The tool 226 has a wrenching interface W2, which in the illustrated embodiment corresponds to a double-hexagon pattern. However, the wrenching interface W2 of the tool 226 may be selected to correspond to any of the coupling nuts 20, 120, 220, 320 described herein above. In other words, a shape of the wrenching interface W2 of the tool 226 may be seen as the negative of the shape of the coupling nut.

The tool 226 includes two legs 226a that are pivotable one relative to the other about a pivot point J. This configuration may allow the ability to completely engage all nut head faces (20d, 120f, 220f, 320f). As shown in FIG. 21, for engaging the tool 226 to the coupling nut, the legs 226a are pivoted away from one another to increase a dimension of an opening 226b of the tool 226 for inserting the coupling nut. Then, the leg 226a may be pivoted about a pivot point J via which the two legs 226a are connected to one another to create the engagement with the coupling nut and torque may be applied on said nut. A locking mechanism may be used to maintain the leg 226a in engagement with the coupling nut during the fastening operation. For instance, the locking mechanism may use a strap, pin, a cam mechanism. The tool drive may be used to lock the tool around the coupling nut. As shown in FIG. 22, once the two legs 226a are locked and engaged on the coupling nut, a whole circumference of the coupling nut is surrounded by the tool 226 via its two legs 226a. This configuration in which the whole circumference of the coupling nut is surrounded by the tool 226, and in which each of the faces of the coupling nut are engaged by the tool 226, may further contribute in overcoming the ovalization problem described above.

In the embodiment shown, each of the legs 226a defines a tool drive 226c provided in the form of a square aperture. Once the legs 226 are both in engagement with the coupling nut to be fastened, the tool drives 226c of the two legs 226a are in register and the wrench may be engaged to the tool 226 via the two tool drives 226c thereby locking the two legs 226a in engagement against the coupling nut.

Referring now to FIGS. 23 to 25, a tool in accordance with yet another embodiment is shown at 326. The tool has a wrenching interface W2, which in the illustrated embodiment corresponds to a double-hexagon pattern. However, the wrenching interface W2 of the tool 326 may be selected to correspond to any of the coupling nuts 20, 120, 220, 320 described herein above. In other words, a shape of the wrenching interface W2 of the tool 226 may be seen as the negative of the shape of the coupling nut.

The tool 326 includes two legs 326a, 326b that are pivotably engaged to one another. In the embodiment shown, the two legs 326a, 326b are detachable from one another to allow a user to dispose a first leg 326a of the tool 326 around a first portion of the coupling nut 20, 120, 220, 320 and a second leg 326b of the tool 326 around a second portion of the coupling nut 20, 120, 220, 320. Once the two legs 326a, 326b are wrapped around the coupling nut, the two legs 326a may be pivotably connected to one another and pivoted toward one another to engage the coupling nut 20, 120, 220, 320 until two tool drives 326e of each of the legs 326a, 326b are in register as shown in FIG. 25. At which point, the drive of the wrench may be inserted through the tool drive 326e to lock the two legs 326a, 326b in engagement with the coupling nut during torqueing. Hence, in the embodiment shown, the two legs 326a, 326b are locked by the drive of the wrench inserted in the tool drives 326e.

As shown in FIG. 23, the first leg 326a defines an arcuate protrusion 326d at a distal end thereof and the second leg 326b defines a shaft portion 326c at a distal end of the second leg 326b. An aperture is defined through the second leg 326b between the shaft portion 326c and a remainder of the second leg 326b. As shown in FIG. 24, the arcuate protrusion 326d is sized to be received within the aperture and a pivotal engagement is defined between the arcuate protrusion 326d and the aperture 326c. By being so engaged, the two legs 326a, 326b are pivotable one relative to the other about an axis going through a pivot point J2 that is created by the engagement of the arcuate protrusion 326d and the shaft portion 326c of the two legs 326a, 326b.

As shown in FIG. 25, once the two legs 326a, 326b are pivotably engaged to one another, the two legs 326a, 326b may be pivoted toward one another until the tool drives 326e of each of the legs 326a, 326b are in register. The wrench may therefore be engaged to the tool drives 326e to lock the two legs 326a, 326b in engagement on the coupling nut. This configuration in which the whole circumference of the coupling nut is surrounded by the tool 326, and in which each of the faces of the coupling nut are engaged by the tool 326, may further contribute in overcoming the ovalization problem described above.

It will be appreciated that many modifications may be made to the tools disclosed herein above. For instance, the legs may include two members pivotably connected to one another such that the two members are pivotable one relative to the other about a pivot axis. In other words, each of the legs may be arcuate legs having two or more members.

It will be appreciated that the tools 126, 226, 326 disclosed herein above may be used to engage any suitable coupling nuts. These coupling nuts may have any number of faces engageable by the tools. For instance, the wrenching interface W2 of the tools may be tailored to engage a coupling nut having a square head, a head having two flat faces connected by two arcuate portions, etc.

The present disclosure relates to a tube nut 20 to be used in tube assemblies 10, featuring a wrench driving interface geometry for the torqueing tools, called here forth a wrenching configuration (WC). The disclosure includes a set of specifically designed tools to drive the coupling nut 20 and apply the assembly torque, such as but not limited to, a double hexagonal flare crowfoot wrench mating with the selected tube nut. The referred tooling may include specifically designed crowfoots compatible with a thrust wire nut configuration, where a commercial flare crowfoot cannot be used due to lack of space and/or accessibility.

An aspect of this disclosure is to change the geometry of the tube nut's wrenching configuration from hexagonal to other geometries that may better distribute the torqueing load along the tube nut's wrenching configuration than what is currently available in the industry, and for most, preventing the use of open-ended wrenches which exacerbates the deformation risk on all fluid system components 10. In a particular embodiment, the design-inherited features linked to this disclosure may therefore enforce that the torqueing procedure be done with a specific tool only, in order to ensure a better load distribution transmitted from the tool to the tube coupling nut.

Common industry-specified tube nuts have a wrenching configuration characterized by exclusively standardized size single hexagonal geometry (6 flats) that can mate with at least 3 different standard torqueing tools: a single hexagonal flare crowfoot 24, a double hexagonal flare crowfoot 26, or a two flats open wrench 22. By opposition, a coupling nut in accordance with the present disclosure may feature a double hexagonal wrenching configuration that can solely mate with a double hexagonal flare crowfoot 26. The other two tools, that is the hexagonal wrench 22 and the single hexagonal crowfoot 24, may not be used because the geometry forming the wrenching configuration of the coupling nut would interfere geometrically when attempting engagement with the aforementioned tools.

The tool inherently selected may be the tool that may provide the best load distribution from the torqueing procedure, from the tool to the tube nut, along the perimeter of its wrenching configuration. A better load distribution may prevent generating localized peak stresses and permanent deformation/ovalization on components of the fluid fitting assembly 10 (in particular at the sealing interface SE).

The tube nuts can feature a variety of wrenching configurations (WC) through which the assembly torque is driven. These configurations may include but not be limited to, for instance, double hexagon, triple square, external spline, Bristol Spline, external spanner driving feature, face hole spanner and serrations. The mating assembly torqueing tools (crowfoot) may have the internal spline/geometry version of the above.

The disclosure is intended to integrate other features into the coupling nuts to enable the mechanism of securing the assembly with positive locking devices, such as but not limited to, what is used in the single hexagonal nut, like typical safety cable and locking wire. Recesses in the points of the wrenching configuration may facilitate the drilling required to obtain the hole by offering a perpendicular and larger surface area, which may otherwise be limited on the proposed geometries.

The disclosure is also intended to include provision to feature a thrust wire configuration of the same tube nuts, along with special tools specifically designed to drive the coupling nut and apply assembly torque in assembly locations characterized by restrictively constrained tool access typical to thrust wire coupling nut configurations. A thrust wire nut configuration affects mainly the internal diameter at the WC, where the thrust wire is fitted, so the design may be compatible with the present disclosure.

The specially designed tools may be defined as wrenches having the driving interface compatible with all wrenching configurations (WC) of the proposed coupling nut individually, and characterized by mechanical features allowing to wrap around the coupling nut, enclosing completely or partially the driving feature when the fluid coupling assembly featuring a thrust wire configuration is fully engaged into the fluid fitting assembly. Tool design options to fully engage and disengage the tool in this scenario include (but are not limited to) a multi-stack thin crowfoot (inserted layer by layer), or a hinged crowfoot (that covers a proportion of the nut perimeter similar to a flare crowfoot, or more).

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An assembly comprising a ferrule of a fluid line and a coupling nut, the ferrule defining a frustoconical face configured to abut a corresponding frustoconical face of a component of a hydraulic system, the coupling nut comprising:

a shank extending along a central axis and having threads to threadably engage corresponding threads of the component, the threads extending circumferentially around the central axis, the shank defining an inner passage extending along the central axis and sized to receive the fluid line;

a shoulder extending circumferentially around the central axis, the shoulder extending around the inner passage and extending radially inwardly beyond the threads;

a head extending from the shank circumferentially around the inner passage relative to the central axis, the head and the shank being two parts of a single body, the head:

defining faces circumferentially distributed about the central axis and edges at junctions between the faces, the faces including torque-transmitting faces each facing a direction having a circumferential component relative to the central axis, and having a cross-section in a plane normal to the central axis, the cross-section defining a plurality of symmetry planes containing the central axis, the torque-transmitting faces free of intersection with the plurality of symmetry planes, wherein rotation of the coupling nut about the central axis induces a translation of the coupling nut about the central axis to deform the ferrule until the frustoconical faces mate with one another.

2. The assembly of claim 1, wherein the cross-section of the head has a baseline surface defining some of the faces and protrusions protruding away from the central axis from the baseline surface, the protrusions defining a remainder of the faces.

3. The assembly of claim 2, wherein the baseline surface is a hexagon, the protrusions including six protrusions each protruding from a respective one of the faces of the hexagon.

4. The assembly of claim 2, wherein the baseline surface is a square, the protrusions including at least four protrusions, each of faces of the square defining a respective one of the at least four protrusions.

5. The assembly of claim 2, wherein the baseline surface is a circle, the protrusions being teeth equidistantly circumferentially distributed about the central axis.

6. The assembly of claim 5, wherein the direction faced by the torque-transmitting faces is free of a radial component relative to the central axis.

7. The assembly of claim 1, wherein the cross-section of the head has a double-hexagonal shape.

8. The assembly of claim 1, wherein the cross-section of the head has a triple-square shape.

9. The assembly of claim 1, wherein the cross-section of the head has a spline shape.

10. The assembly of claim 1, wherein the cross-section of the head is axisymmetric.

11. A hydraulic system, comprising:
a fluid line coupled to a ferrule, the ferrule defining a first frustoconical face; and
a coupling nut sealingly engaging the ferrule to a component of the hydraulic system, the component defining a second frustoconical face, rotation of the coupling nut about a central axis induces a translation of the coupling nut about the central axis to deform the ferrule until the first frustoconical face mates with the second frustoconical face, the coupling nut having:

a shank extending along the central axis and defining threads to threadably engage corresponding threads of the component, the threads extending circumferentially around the central axis, the shank defining an inner passage extending along the central axis and sized to receive the fluid line; and a head extending from the shank circumferentially around the inner passage relative to the central axis, the head and the shank being two parts of a single body, the head:

defining faces circumferentially distributed about the central axis and edges at junctions between the faces, the faces including torque-transmitting faces each facing a direction having a circumferential component relative to the central axis, the edges including a first subset of the edges and a second subset of the edges, the edges of the first subset located radially outwardly of the edges of the second subset, all of the torque-transmitting faces contained radially between the edges of the first subset and the edges of the second subset.

12. The hydraulic system of claim 11, wherein the edges of the first subset are contained within a first cylindrical surface boundary having a first radius, the edge of the second subset are contained with a second cylindrical surface boundary having a second radius different than the first radius, all of the torque-transmitting faces contained radially between the first radius and the second radius.

13. The hydraulic system of claim 11, wherein a cross-section of the head on a plane normal to the central axis has a baseline surface defining some of the faces and protrusions protruding away from the central axis from the baseline surface, the protrusions defining a remainder of the faces.

14. The hydraulic system of claim 13, wherein the baseline surface is a hexagon, the protrusions including six protrusions each protruding from a respective one of the faces of the hexagon.

15. The hydraulic system of claim 13, wherein the baseline surface is a square, the protrusions including at least four protrusions, each of faces of the square defining a respective one of the at least four protrusions.

16. The hydraulic system of claim 13, wherein the baseline surface is a circle, the protrusions being teeth equidistantly circumferentially distributed about the central axis.

17. The hydraulic system of claim 11, wherein a cross-section of the head of the coupling nut taken on a plane normal to the central axis has a double-hexagonal shape.

18. The hydraulic system of claim 11, wherein a cross-section of the head of the coupling nut taken on a plane normal to the central axis has a triple-square shape.

19. The hydraulic system of claim 11, wherein a cross-section of the head of the coupling nut taken on a plane normal to the central axis has a spline shape.

20. The hydraulic system of claim 11, wherein a cross-section of the head of the coupling nut taken on a plane normal to the central axis is axisymmetric.

* * * * *